United States Patent [19]

Lenchik et al.

[11] Patent Number: 5,327,573
[45] Date of Patent: Jul. 5, 1994

[54] METHOD FOR SUPPORTING VOICE COMMUNICATIONS BETWEEN COMMUNICATION SYSTEMS

[75] Inventors: Vitaly Lenchik, Lake Zurich; Robert W. Furtaw, Schaumburg; David S. Robins, Buffalo Grove, all of Ill.

[73] Assignee: Motorola, Inc., Schaumburg, Ill.

[21] Appl. No.: 68,830

[22] Filed: Mar. 12, 1993

Related U.S. Application Data

[63] Continuation of Ser. No. 656,360, Feb. 15, 1991, abandoned.

[51] Int. Cl.⁵ ............................................. H04B 3/36
[52] U.S. Cl. ...................................... 455/14; 455/17; 455/34.1; 455/34.2
[58] Field of Search ............... 455/14, 17, 34.1, 34.2, 455/54.1, 55.1, 57.1, 58.1, 58.2, 72; 370/112; 375/8, 38, 40; 340/825.47

[56] References Cited

U.S. PATENT DOCUMENTS

| | | | |
|---|---|---|---|
| 3,681,694 | 8/1972 | Sarati | 455/17 |
| 3,878,463 | 4/1975 | Lanigan | 455/17 |
| 4,553,262 | 11/1985 | Coe | 455/34.1 |
| 4,611,322 | 9/1986 | Larson et al. | 370/60 |
| 4,656,645 | 4/1987 | Kaneko | 375/40 |
| 4,775,999 | 10/1988 | Williams | 455/34.1 |
| 4,825,451 | 4/1989 | Schwartz | 375/38 |
| 4,908,839 | 3/1990 | Morimoto et al. | 375/40 |
| 4,972,460 | 11/1990 | Sasuta | 455/17 |
| 5,034,966 | 7/1991 | Hochstein | 375/40 |
| 5,058,133 | 10/1991 | Duncanson et al. | 375/38 |
| 5,058,199 | 10/1991 | Grube | 455/34.1 |
| 5,095,529 | 3/1992 | Comroe et al. | 455/34.1 |
| 5,103,445 | 4/1992 | Östlund | 455/54.1 |

*Primary Examiner*—Reinhard J. Eisenzopf
*Assistant Examiner*—Andrew Faile
*Attorney, Agent, or Firm*—Steven G. Parmelee

[57] ABSTRACT

An intersystem communication path (20, 67) can be established on an as needed basis. Already established paths are fully utilized before new paths are established. Already established paths can be automatically disconnected when no longer needed, or when existing calls can be merged on to fewer lines. Dial up lines can be mixed with dedicated lines. If desired, excess capacity can be guaranteed to accommodate high traffic conditions and/or other conditions that precipitate a likely need for communication services between systems.

15 Claims, 5 Drawing Sheets

METHOD FOR SUPPORTING VOICE COMMUNICATIONS BETWEEN COMMUNICATION SYSTEMS

This is a continuation of application Ser. No. 07/656,360, filed Feb. 15, 1991 and now abandoned.

FIELD OF THE INVENTION

This invention relates generally to communication systems, including but not limited to a method that allows land mobile radio systems to be linked together in an efficient manner.

BACKGROUND OF THE INVENTION

The basic operation and structure of a land mobile radio system is well known. Land mobile radio systems typically comprise one or more radio communication units and one or more repeaters that transceive information via the RG communications channels. These communications channels are typically narrow band frequency modulated channels. Further, trunked communication systems are organized so that a group of users are served by a set of repeaters that support trunked communication resources within an RF coverage area.

When a subscriber unit leaves the RF coverage area of one communication system, another communication system may therefore provide necessary service. A well known technique for establishing a link between two users served by different communication systems is by means of a telephone interconnect call. In order to place a call, dual-tone multiple-frequency signalling is often used. This technique is cumbersome in the dispatch environment because it requires several seconds of delay to establish the connection, as compared with the conversation which itself may only last a few seconds.

Another method of interconnecting communication systems relies upon dedicated lines that link the communication systems continuously. These lines may be either analog or digital lines that are leased from a public utility, or that are privately owned. In a dispatch environment traffic is characterized by extreme burstiness with very low average utilization. Nevertheless, the infrastructure guarantees service to worst case traffic rather than average traffic. As a result, most of the time the infrastructure remains idle. Therefore, this method eliminates an initial connection delay, but only at the expense of maintaining connection for significant periods of time when not in use.

A third method of interconnecting communication systems is by means of a packet data network. This method provides an efficient method for intercommunication system communication; however, the transmission delay can be several seconds long, making this unacceptable for voice communication.

Therefore, current methods of interconnecting communication system sites are inefficient, cumbersome to use, and do not allow an integrated solution.

SUMMARY OF THE INVENTION

These problems and others are substantially resolved by a method for conducting voice communications between a first communication unit serviced by a first RF communication system and a second communication unit served by a second RF communication system. Pursuant to this method, one determines whether a first communication path already exists between the two communication systems. When such a path does exist, one then determines whether this existing path has sufficient capacity to support the voice communication. When the above proves true, the method utilizes the established path to support the voice communication.

In one embodiment of the invention, when either such a communication path does not already exist, or has insufficient capacity, the method provides for automatic establishment of a communication path that will support the voice communication.

In another embodiment, the communication paths will also support an exchange of system control information in addition to the voice communication.

In yet another embodiment, the method provides for at least occasional determination as to whether the established path should continue to be maintained, and/or whether many established paths between two systems can be reduced in number while continuing to accommodate an identical number of ongoing communications.

DESCRIPTION OF A PREFERRED EMBODIMENT

Figure 1:
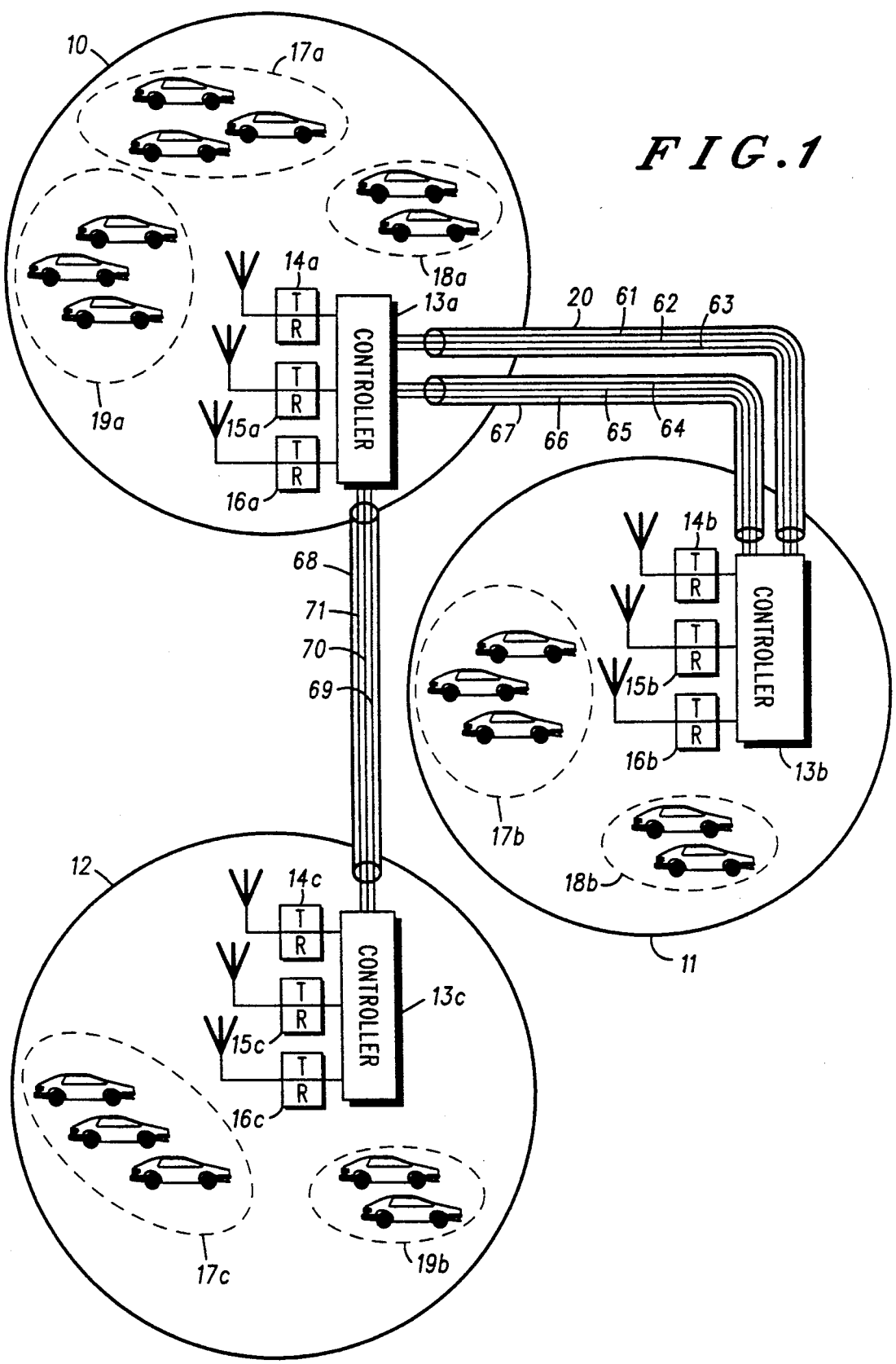
FIG. 1 comprises a block diagram depiction of a plurality of RF communication systems intercoupled in accordance with the invention.

In FIG. 1, a first, second, and third RF communication system (10, 11, and 12) are depicted. These systems may be separated from one another by a significant geographic distance, or may have overlapping coverage areas, depending upon the needs of a particular application. Furthermore, the systems themselves may be different one from the other, according to the needs of a particular application. As depicted, each system here comprises a trunked communication system having a resource controller (13a–c) and three repeaters (14a–c, 15a–c, and 16a–c). In this embodiment, it will be presumed that one of the repeaters (14a–c) for each system constitutes a control resource that supports various system functions, such as call assignments and the like. The remaining two repeaters (15a–c and 16a–c) comprise voice channels that may be allocated on an as needed basis to support desired communications between communication units serviced by the resource controller (13a–c).

The general nature and functionality of the above described elements of each system are well known and understood by those skilled in the art. Therefore, no further description will be provided here.

For purposes of illustration, three groups or fleets are illustrated in FIG. 1. The first group (17) includes a sub-group (17a) located within the coverage area of the first communication system (10), a second sub-group (17b) contained within the coverage area of the second communication system (11), and a third sub-group (17c) contained within the coverage area of the third communication system (12). A second fleet (18) has a first sub-group (18a) contained in the coverage area of the first communication system (10) and a second sub-group (18b) contained within the coverage area of the second communication system (11). Lastly, a third fleet (19) includes a first sub-group (19a) contained within the coverage area of the first communication system (10) and a second sub-group (19b) contained within the coverage area of the third communication system (12).

So configured, members of the first sub-group (17a) of the first fleet, all being located within the coverage area of the first communication system (10), can communicate amongst one another using the resource controller (13a) and repeaters (14a, 15a, and 16a) of the first communication system (10) in accordance with well understood prior art technique. Similarly, the members of the second fleet (18a) and of the third fleet (19a) can also communicate with one another within the coverage area of the first system (10).

Figure 2:
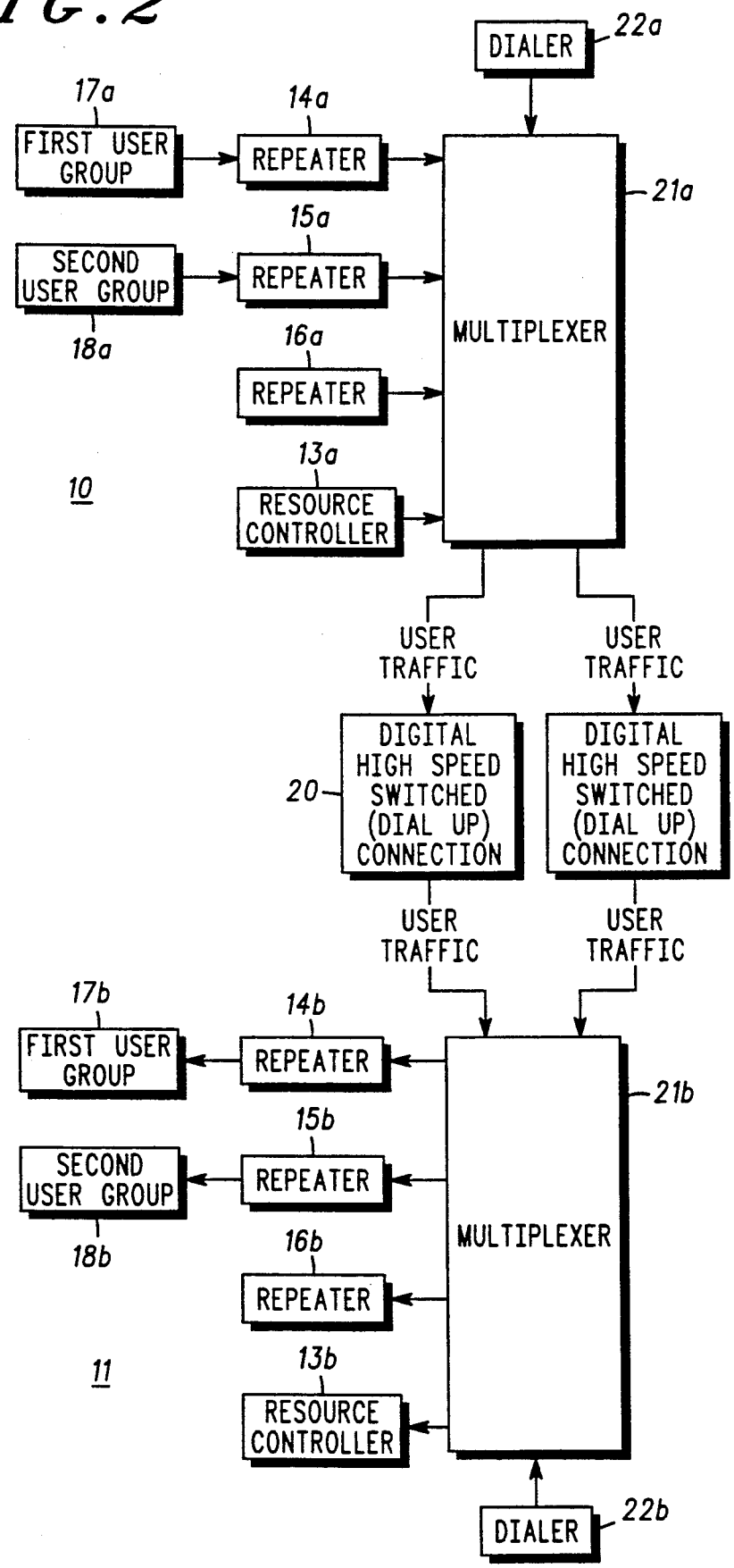
FIG. 2 comprises a block diagram depiction of two RF communication systems intercoupled in accordance with the invention.

If, however, the members of the second fleet (18) wish to conduct a group wide communication, then an intersystem communication path must be established, since, as depicted, the two sub-groups (18a and 18b) of this fleet are located within two separate communication systems (10 and 11) and the infrastructure of which communication systems will not, by service limitations, be able to include those communication units that are located outside the service coverage area of their infrastructure, respectively. A dial up line (20) provides this path. Referring momentarily to FIG. 2, the resource controller (13a and 13b) of the two systems (10 and 11) along with the various repeaters (14a–b, 15a–b, and 16a–b) are coupled to a multiplexer (21a and 21b, respectively), such that the output from each can be appropriately compressed and/or packetized for transmission over the dial up link (20), and subsequently demultiplexed and provided to an appropriate corresponding repeater or resource controller at the receiving end. Each system also includes an appropriate dialer (22a and 22b) to allow access to the dial up line as provided through a PSTN or other landline resource provider.

Figure 5A:
FIGS. 5a–b depict packet formating for voice and data messages.
Figure 5B:

In this embodiment, the dial up line can be, for example, a 56 kbps DDS dial up line or a 64 kbps ISDN link. The bandwidth of either link can simultaneously carry more than a single digitized voice circuit, particularly where compression and packetizing methods are used. With momentary reference to FIGS. 5a and b, the multiplexers (21a and 21b) provide a voice packet (31) that includes an address field (32), a voice type field (33) (to identify the packet as a voice packet), a compressed voice field (34), and a Cyclic Redundancy Check (CRC) field (35). The particular form of voice compression selected will of course depend upon the needs of a particular application. In addition, or in the alternative, a variety of voice compression methodologies can be accommodated in a single system, with higher quality techniques being utilized for higher priority and/or higher cost services. The data packet (41) similarly includes an address field (42), a type field (43) to identify the packet as a data packet, and a CRC field (44). In substitution for the compressed voice field, intrasite supervisory data information (45) allows an appropriate exchange of control information between systems. For example, this field can accommodate call establishment information, auto registration information, dynamic regrouping information, and so forth.

Figure 6:
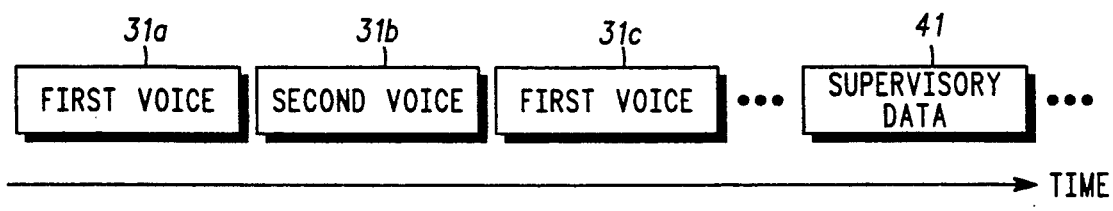
FIG. 6 comprises a timing diagram depicting multiplexing of packet information.

With reference to FIG. 6, compressed voice frames for different communications are seen multiplexed with one another and with supervisory data packets. These multiplexed packets are what the system transports to the dial up connection (20).

Figure 3:
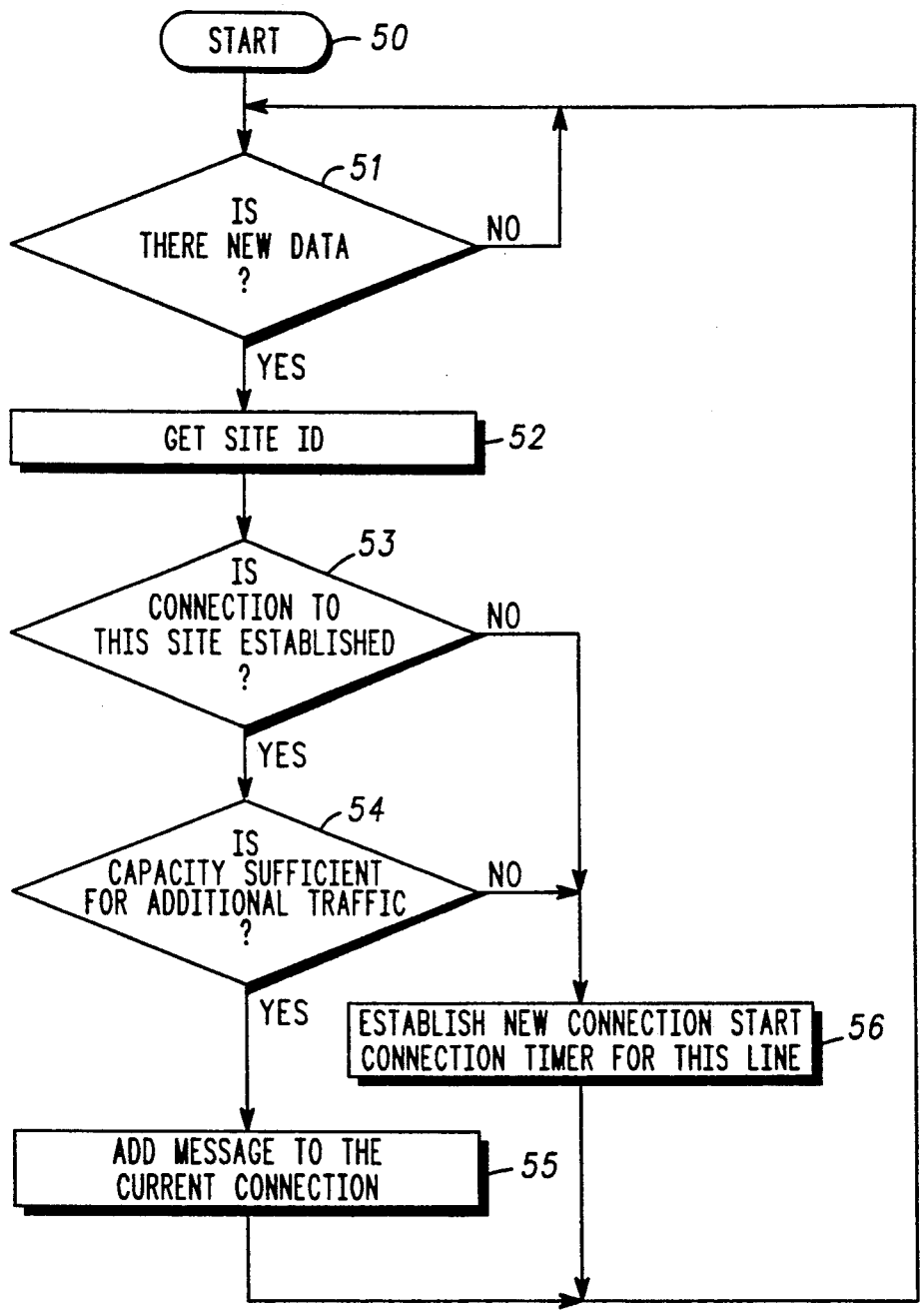
FIG. 3 comprises a flow diagram depicting a path establishment mechanism.

Importantly, this invention does not require constant maintenance of a dedicated landline between communication systems. Furthermore, this system obtains maximum effective use of those landline links that are established from time to time. For example, referring now to FIG. 3, intersystem communication path establishment procedures will be described.

The resource controller (13a–c) of each communication system includes a significant amount of processing capability. Pursuant to this embodiment, these processing abilities are supplemented to allow the following determinations and actions to be made. Upon initiation (50), the process first determines whether new data exists for intersystem transmission (51). If not, the process simply monitors for new data to appear. Once new data exists, a destination site ID is obtained (52) to identify the particular system with which a communication link must be utilized. (This site ID can be obtained, for example, from the requesting unit itself, or by referring to a local or remotely maintained look-up table that associates the requesting unit and on target units with destination site IDs.) With the destination identified, the process then determines whether an existing connection to that site already exists (53). If such a link does not already exist, then the dialer (22a–b) will be utilized to establish a new connection via known dial up methodologies, and a connection timer will be initiated for the newly established line (56). Subsequently, the information can be provided to the destination site in packetized form as described above.

If a communication path already exists to the destination site (53), the process then determines whether the existing path has capacity to support the new communication (54). If not, then again a new path is established and a connection timer initiated for the newly established line (56). Otherwise, presuming sufficient capacity, the new message will simply be multiplexed with other messages currently being supported by the link (55).

With reference again to FIG. 1, therefore, if an existing link (20) has bandwidth sufficient to support three communications, and if two of those sub-channels (61 and 62) are already in use to support communications, and the first sub-group (17a) initiates a communication that must include the members of the sub-group (17b) located in the second communication system (11), the first system (10) will first determine that an existing intersystem link (20) already exists, and will then determine that the existing link (20) has sufficient capacity to support the desired communication by use of the third sub-channel (63). By way of further example, if the three sub-channels (61–63) of the first communication path (20) are all in use at the time the first group communication initiates, the above described process will allow the establishment of a new communication path (67) to supplement the intersystem capacity of the already established link (20). When newly established, any of the three sub-channels (64–66) of the second link (67) can be utilized to support the new communication.

In a similar manner, and by way of further example, the above activities can be further enhanced through establishment of yet additional intersystem links to other systems. For example, the first system (10) could establish a link to the third system (12) to support the communication between the first group communication units (17a–c). Once this link (68) has been established, however, and one of its sub-channels (69–71) dedicated to servicing the latter communication, a subsequent communication need between the two systems, for example, to support a communication of third group communication units (19a–b), the above described process will allow the new communication to automatically be supported by the existing link (68) without necessitating the dial up of a new link.

In an alternative embodiment, a dedicated line (20) could be maintained between two sites (10 and 11) that have a need for particularly frequent intersystem communications. The bandwidth resources of this dedicated link could be utilized in the same manner as described above, such that when the dedicated link had sufficient capacity to support a current communication, dial up of an additional line could be obviated, whereas when the dedicated link was fully loaded, a dial up non-dedicated link could be established to support the additional communications.

Figure 4:
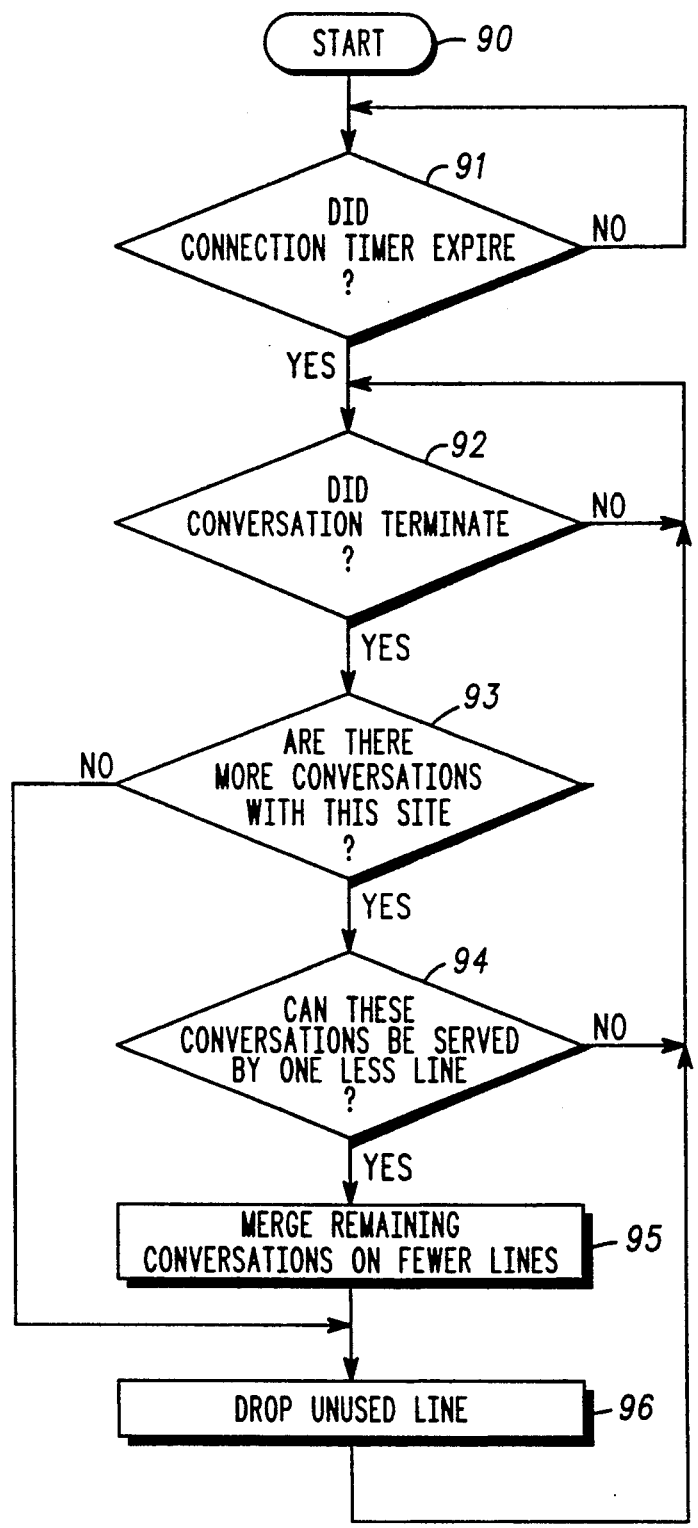
FIG. 4 comprises a flow diagram depicting a line disconnect mechanism.

In addition to allowing automatic establishment of dial up lines to support current needs for communication paths, this embodiment also supports automatic disconnect procedures for previously established lines as appropriate. As depicted in FIG. 4, upon initiation (90), the process determines whether the connection timer previously initialized upon establishment of this particular line has expired (91). If not, connection timer monitoring continues. If expiration has occurred, however, the process then determines whether the communication being supported has concluded (92). If not, the process monitors for termination of the communication. Once termination occurs, the process determines whether there are any other communications currently in progress between the two sites (again, these communications may be either voice communications or an exchange of control information between the sites). If no other communications are then being supported, the line is dropped (96). If other communications are in progress, the process determines whether these additional communications can be served notwithstanding termination of a link. For example, in FIG. 1, presume that both links (20 and 67) are established, and that the first (20) supports two communications and the other (67) supports only one communication. With only a total of three communications being supported, all three communications could be supported by a single path if the communications were appropriately merged to a single line (94). If the additional communications cannot be served by fewer lines, the process continues to monitor for termination of additional communications. If, however, fewer lines can suitably support the existing communications, the remaining conversations will be merged on to fewer lines (95) and the unused line will be dropped (96).

As described, this system ensures that adequate resources are available to support intersystem communication needs, both in support of communication unit to communication unit conversations and in support of system to system communications, per se. These resources are provided in an efficient and economical manner. Dial up lines are only utilized when necessary, and only for so long as absolutely required.

In another embodiment, the establishment of new lines can slightly precede the actual need for such lines, and/or the disconnect of existing lines can be slightly postponed, to accommodate a likely need to support a communication between systems. For example, historical analysis of loading by system operators may indicate that a greater need for intersystem connections exist during certain hours of the day. The system can modify its processing as described above to maintain a predetermined intersystem capacity excess in order to quickly meet likely communication needs. For example, the above process can be modified slightly to assure that at least one sub-channel always remains vacant and available. Therefore, if all three sub-channels of an established link are suddenly allocated, a second dial up line can be established even though no immediate need for those resources currently exist, in order to be able to quickly accommodate a likely communication need.

What is claimed is:

1. A method of conducting a voice communication between a first communication unit serviced by a first radio frequency communication system and a second communication system serviced by a second radio frequency communication system, comprising the steps of:
   A) determining whether a first multi-channel communication path exists between the first and second radio frequency communication systems;
   B) when the first multi-channel communication path so exists, determining whether the first multi-channel communication path has at least one channel to support the voice communication;
   C) when the first communication path has at least one channel, initially establishing the voice communication using only one channel of the first multi-channel communication path;
   D) when either the first multi-channel communication path does not exist or the first multi-channel communication path has insufficient capacity;
      i) automatically establishing a new multi-channel communication path to support the voice communication;
      ii) initially establishing the voice communication using only one channel of the new multi-channel communication path.

2. The method of claim 1, wherein step C further includes the step of:
   C1) compressing the voice communication prior to using the one channel of the first multi-channel communication path.

3. The method of claim 1, and further including the step of:
   C1) using the first multi-channel communication path to also support exchange of system control information between the first and second radio frequency communication system.

4. The method of claim 1, and further including the step of:
   C1) when the voice communication has concluded, determining whether the first multi-channel communication path should be maintained.

5. The method of claim 4, wherein step C1 further includes the steps of:
   C1a) determining whether the first multi-channel communication path then supports any other communications between the first and second radio frequency communication systems;
   C1b) when the first multi-channel communication path does not then support any other communications, dropping the first multi-channel communication path.

6. The method of claim 5, wherein step C1 further includes the step of:

C1c) when the first multi-channel communication path does then support another communication, determining whether any other communication paths exist between the first and second radio frequency communication systems.

7. The method of claim 6, wherein step C1 further includes the step of:
C1d) when another communication path so exists, determining whether all of the communications then being supported by both the first multi-channel communication path and the other existing communication paths can be supported by a smaller number of communication paths.

8. The method of claim 7, wherein step C1 further includes the step of:
C1e) when a smaller number of communication paths will support the existing communications, reducing the number of existing communication paths.

9. The method of claim 8, wherein step C1 further includes the step of:
C1f) when the number of existing communication paths are reduced because a smaller number of communication paths will support the existing communications, reassigning communications that were assigned to communication paths that were dropped to communication paths that were retained.

10. a method comprising the steps of:
A) determining that, although there is no present necessity to support a voice communication between a communication unit in a first radio frequency communication system and a communication unit in a second radio frequency communication system, it will likely be necessary to soon support a voice communication between a communication unit in a first radio frequency communication system and a communication unit in a second radio frequency communication system;
B) determining whether a first communication path exists between the first and second radio frequency communication systems;
C) when the first communication path so exists, determining whether the first communication path has sufficient capacity to support the voice communication, should it be necessary to soon support the voice communication.

11. The method of claim 10, and further including the step of:

D) when either the first communication path does not exist or the first communication path has insufficient capacity, automatically establishing a new communication path to support the voice communication.

12. The method of claim 11, and further including the step of:
E) when the new communication path is automatically established, beginning a connection timer.

13. The method of claim 12, and further including the step of:
F) when the connection timer indicates that at least a predetermined period of time has passed, determining whether the new automatically established communication path should be maintained.

14. A method of conducting a voice communication between a first communication unit serviced by a first RF communication system and a second communication unit serviced by a second RF communication system, which first and second RF communication systems are coupled by a dedicated communication path, comprising the steps of:
A) determining whether the dedicated communication path will initially support the voice communication;
B) when the dedicated communication path will support the voice communication, using the dedicated communication path to initially support the voice communication;
C) when the dedicated communication path will not initially support the voice communication:
  i) determining whether a non-dedicated communication path exists between the first and second RF communication systems;
  ii) when the non-dedicated communication path so exists, determining whether the non-dedicated communication path has sufficient capacity to initially support the voice communication;
  iii) when the non-dedicated communication path has sufficient capacity, initially establishing the voice communication using the non-dedicated communication path.

15. The method of claim 14, and further including the step of:
Civ) when the non-dedicated communication path does not have sufficient capacity to initially support the voice communication, automatically establishing a new non-dedicated communication path to initially support the voice communication.

* * * * *